United States Patent [19]

Pinson

[11] Patent Number: 4,967,980
[45] Date of Patent: Nov. 6, 1990

[54] OPTICAL FIBER GUIDED TUBE-LAUNCHED PROJECTILE SYSTEM

[75] Inventor: George T. Pinson, Huntsville, Ala.

[73] Assignee: The Boeing Company, Seattle, Wash.

[21] Appl. No.: 372,569

[22] Filed: Jun. 28, 1989

Related U.S. Application Data

[60] Division of Ser. No. 195,621, May 17, 1988, Pat. No. 4,907,763, which is a continuation-in-part of Ser. No. 32,448, Mar. 31, 1987, Pat. No. 4,770,370.

[51] Int. Cl.$^5$ .............................................. F41G 7/32
[52] U.S. Cl. .................... 244/312; 244/3.16; 244/3.17
[58] Field of Search ...................... 244/3.12, 3.16, 3.17

[56] References Cited

U.S. PATENT DOCUMENTS

| | | | |
|---|---|---|---|
| 3,156,185 | 11/1964 | Hermann et al. | 102/374 |
| 3,233,548 | 2/1966 | Chilowsky | 244/3.12 |
| 3,319,781 | 5/1967 | Simpson et al. | 206/389 |
| 3,607,490 | 9/1971 | Heinzman | 156/56 |
| 3,868,883 | 3/1975 | Tucker | 89/1.8 |
| 4,185,796 | 1/1980 | Riley | 244/3.12 |
| 4,573,647 | 3/1986 | Latent et al. | 244/3.12 |
| 4,611,771 | 9/1986 | Gibbons et al. | 244/3.12 |
| 4,615,496 | 10/1986 | Pinson | 244/3.16 |
| 4,770,370 | 9/1988 | Pinson | 244/3.12 |
| 4,860,968 | 8/1989 | Pinson | 244/3.12 |

Primary Examiner—Charles T. Jordan
Assistant Examiner—Rochelle Lieberman
Attorney, Agent, or Firm—Finnegan, Henderson Farabow, Garrett & Dunner

[57] ABSTRACT

An optical fiber-guided projectile launch system for firing from a generally tubular launcher comprising a projectile having tubular casing, an extended length of optical fiber disposed in the casing for continuous streaming from the trailing end thereof, a portion of the fiber extending from the casing for operative connection to a controller, an axial groove in the casing surface for removably receiving a part of the extending fiber, tape securing the fiber part in the groove with force sufficient to withstand axial launch forces but insufficient to resist imposed radial forces, and a communication device providing two-way communication over the fiber. An alternative embodiment uses an ungrooved projectile casing with a tube launcher having a preformed fiber relief-groove in the inner peripheral surface and a discarding sabot having a tab member receivable in the relief. For both embodiments, a controller is provided in two-way communication with the projectile for receiving and processing target data from the projectile and for transmitting guidance data, including operator manual guidance, to the projectile, and an adaptor is provided for guiding fiber streaming axially from a wound bobbin in the projectile.

5 Claims, 6 Drawing Sheets

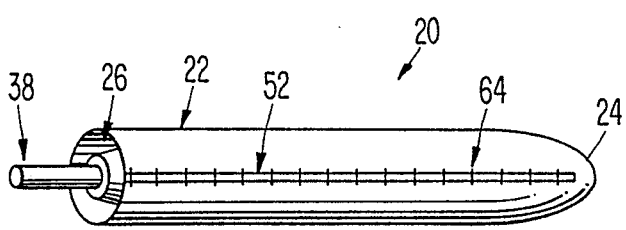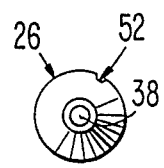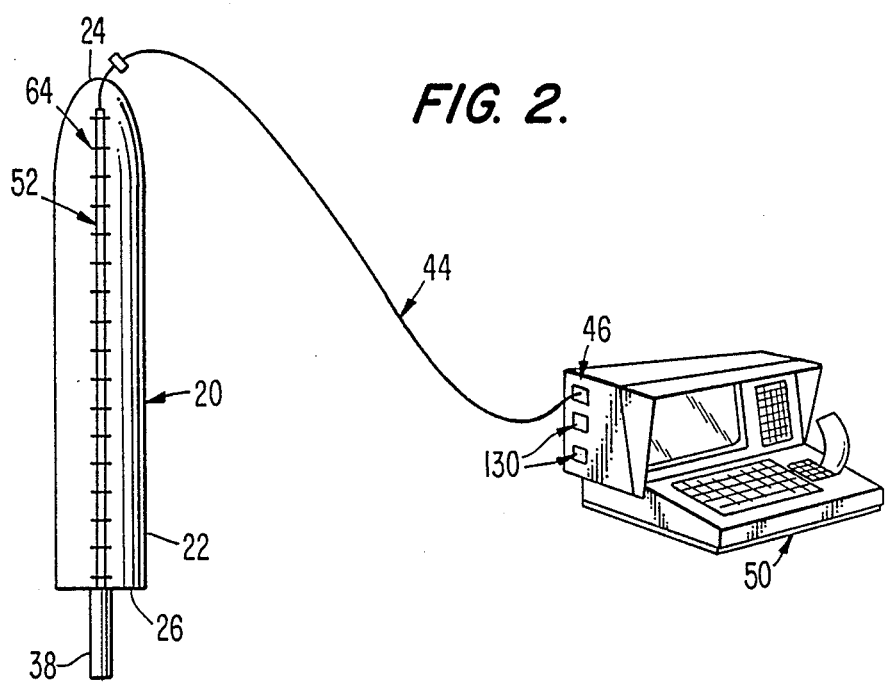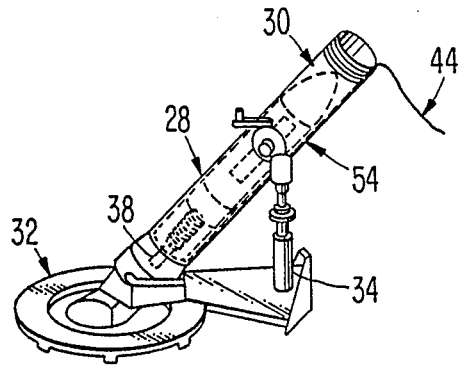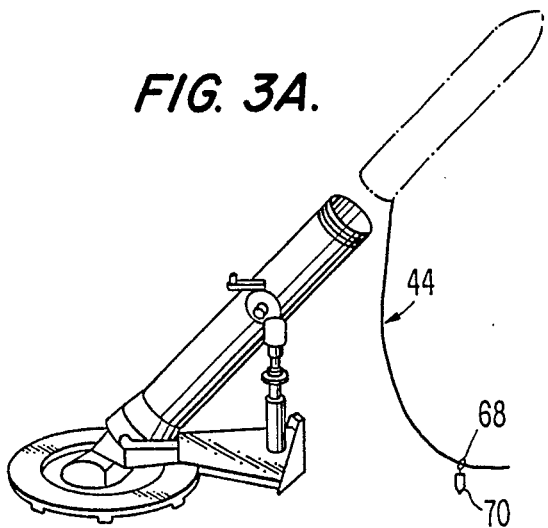

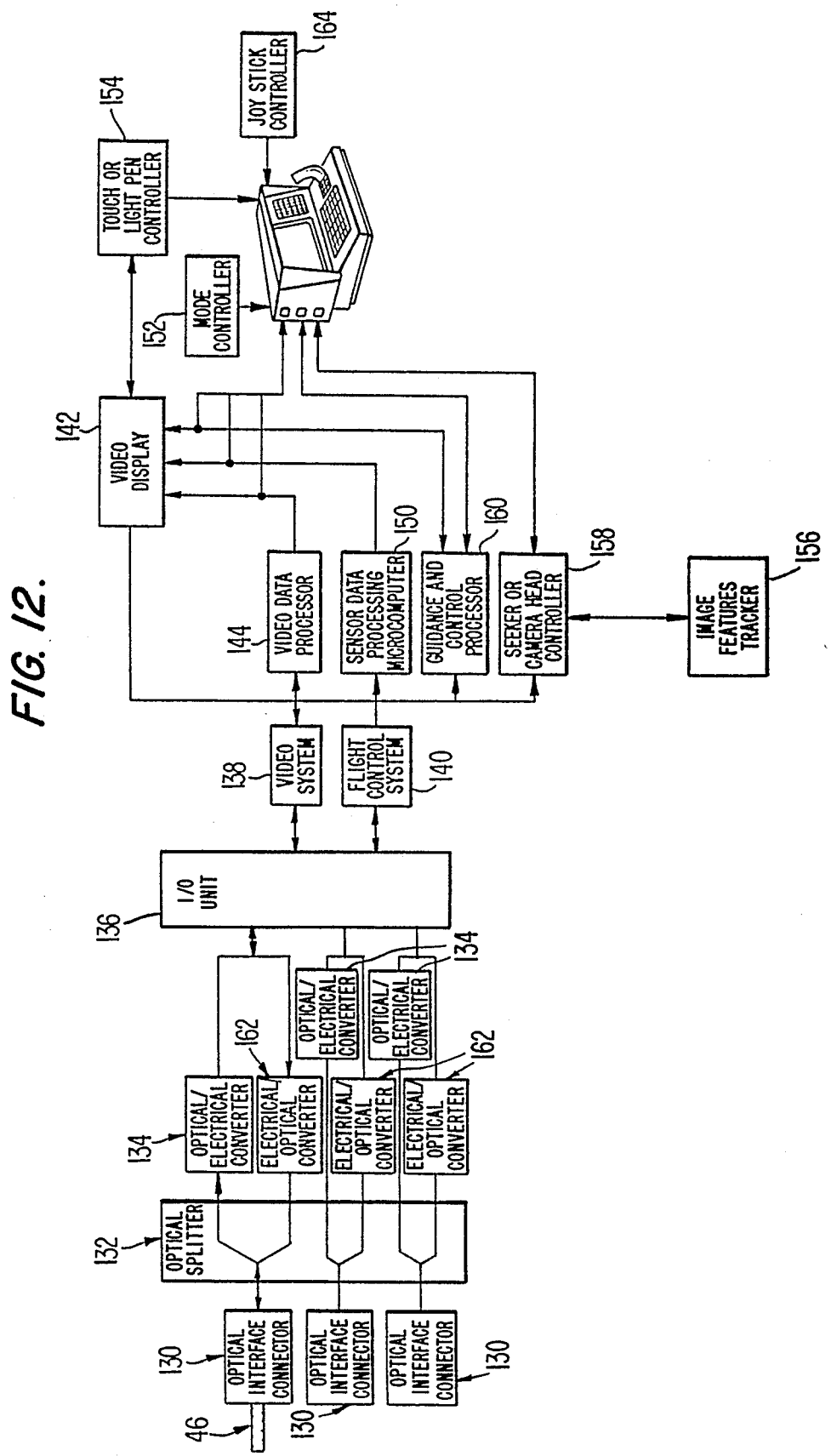

OPTICAL FIBER GUIDED TUBE-LAUNCHED PROJECTILE SYSTEM

This is a division of application Ser. No. 195,621, filed May 17, 1988, now U.S. Pat. No. 4,907,763, which is a continuation-in-part of application Ser. No. 032,448 filed Mar. 31, 1987, now U.S. Pat. No. 4,770,370.

BACKGROUND OF THE INVENTION

1. Field of the Invention

This invention relates to a optical fiber guided projectile system, and, more particularly, to an optical fiber guided projectile capable of being fired from a tubular launcher, such as a mortar or a cannon, and to the control system therefor.

2. Description of Related Art

Means for in-flight guidance of projectiles, such as missiles, are known. Originally, such guidance was primarily provided through means of on-board systems. The complexity and cost of these systems led to radio, radar or laser controlled systems. These systems also required expensive and complex equipment to be carried by the projectile and were subject to interference with the signals to or from the projectile. A more recent development is the wire guided projectile. Such systems eliminated the need for complex on-board equipment and precluded interference with data transfer. These systems, however, were limited in terms of the volume and direction of data transfer to and from the projectile.

The advent of optical fiber as a communication means offers advantages over the wire guided systems since optical fibers can transmit substantially greater volume of data than wire of comparable size, and optical fiber can accommodate data traveling in both directions simultaneously. To obtain simultaneous two-way communication with wire-guided systems two parallel wires are required.

Riley, U.S. Pat. No. 4,185,796, teaches the use of optical fibers as a communication link between a missile and a remote guidance and control system. The system of Riley discloses two-way transmission of data over an optical fiber which streams from a bobbin in the missile during flight. The specific nature of the missile and its launch system is not disclosed in Riley. Additionally, Riley does not teach a control system providing direct operator input to missile guidance in response to real time target data sensed by the missile.

Fiber optic control systems have been used to provide two-way data transmission in the U.S. Army's Fiber Optic Medium Assault Weapon (FOMAW) and Fiber Optic Guided Missile (FOG-M). While such systems are satisfactory in certain applications, neither FOMAW, FOG-M nor the Riley device are capable of being launched or fired from existing weapons systems such as mortars or cannon. While desirable, an optical fiber guided projectile capable of being fired from a mortar or cannon has not been developed because the exceedingly high "G" loads, in excess of 10,000 G's, generated during firing destroy the relatively fragile optical fiber. Laten et al. U.S. Pat. No. 4,573,647, is directed to a mechanism for deploying optical fiber while relieving the G forces imposed on the fiber during missile launch. That mechanism involves securing the optical fiber on the outside surface of the missile with tape having a tear strip one end of which is secured to the launch vehicle to tear an opening in the tape as the missile leaves the launch vehicle. The Laten et al device, however, has several disadvantages rendering it unable to be used with a mortar or cannon fired projectile. First, by securing the fiber to the outside surface of the missile, the launch tube must have a diameter greater than the missile; the resulting annular space around the missile would permit blow-by in a mortar or cannon reducing the launch thrust. The use of the tear strip would require unusual modification of the mortar tube or cannon barrel in order to attach the end of the tear strip. Moreover, even after the tape is split by the tear strip, the relatively fragile optical fiber would have to pulled through the torn tape during launch.

The subject invention provides an optical fiber guided projectile capable of being fired from either an unmodified mortar or cannon or a modified tube launcher. The optical fiber deployment mechanism of the invention does not interfere with the projectile launch performance and precludes damage to the optical fiber during launch. The invention also provides a control system in which direct, real time operator control of projectile flight and target selection is available.

Other objects and advantages of the invention will be set forth in part in the description which follows, and in part will be apparent from the description, or may be learned by practice of the invention. The objects and advantages of the invention may be realized and attained by means of the instrumentalitites and combinations particularly pointed out in the appended claims.

SUMMARY OF THE INVENTION

In accordance with the purpose of the invention, as embodied and broadly described herein, the optical fiber guided projectile launch system for firing a projectile comprises a generally tubular launcher having a base end, a launch end, and an internal peripheral surface; and a generally tubular projectile having a trailing end and being positionable in the launcher with the projectile trailing end proximate the launcher base end. An extended length of optical fiber is disposed in the projectile for continuous streaming from the trailing end during flight of the projectile, a portion of the fiber extending from the trailing end of the projectile and including a free end for operative connection to a controller. Relief means are formed in the inner peripheral surface of the launcher and extend from a position adjacent the projectile trailing end to the launch end for removeably receiving part of the extending fiber portion. Also, means are provided in the projectile for connection to another end of the fiber for data communication through the fiber.

Preferably, the system further includes means for forcing the received fiber part out of the relief means during projectile launch, and this forcing means can include a sabot for also providing a gas seal between the projectile trailing end and the launcher base end during launch. The sabot includes a tab member extending into the relief means for preventing blow-by of launch gases through the relief means and for forcing the received fiber part out of the relief means during launch.

Further in accordance with the present invention, as embodied and broadly described herein, the launcher for launching the optical fiber guided projectile comprises a generally cylindrical tube having a base end, a launch end, and an inner peripheral surface sized to receive the projectile with the projectile trailing end positionable proximate the base end. The optical fiber extends out from the launch end for connection to the controller. Relief means are formed in the inner peripheral surface extending axially from the trailing end position to the launch end. The relief means, such as a groove, is sized and configured to removeably receive at least a part of the extending fiber. Preferably, the depth of the groove is not greater than about 110% of the thickness of the fiber.

Preferably, the projectile includes means for sensing target data and for transmitting that data via communication means through the optical fiber. The projectile preferably also includes means responsive to data received through the fiber via the communications means for controlling the flight path of the projectile.

The invention further comprises command and control means for receiving and processing data transmitted from the projectile and for transmitting guidance data to the projectile. Preferably, the command and control means includes means for manually controlling the flight of the projectile.

Still further in accordance with the present invention, as embodied and broadly described herein, the apparatus for guiding fiber streaming from a wound, truncated, conically-shared bobbin in the axial direction comprises an adapter element having a smooth axially tappered peripheral surface, preferably of cosinusoidal shape, and means for mounting the adaptor element coaxially adjacent the wound bobbin at the smaller diameter bobbin end.

The invention resides in the novel parts, constructions, arrangements, combinations and improvements shown and described. The accompanying drawings, which are incorporated in and constitute a part of this specification, illustrate the presently preferred embodiments of the invention and, together with the description, serve to explain the principles of the invention.

BRIEF DESCRIPTION OF THE DRAWINGS

FIG. 1 is a graphic perspective view of the projectile of the invention.

FIG. 1A is a graphic representation of the left end of the projectile of FIG. 1.

FIG. 2 is a graphic representation of the projectile and command/control console elements of the weapons system of the invention.

FIG. 3 is a plan view of a conventional mortar partially cut away to show the projectile of the invention in place.

FIG. 3A depicts the relation of the projectile and mortar of FIG. 3 after firing.

FIG. 12 is a diagrammatic representation of the circuitry of the command and control means of the weapons system of FIG. 10.

Reference will now be made to the present preferred embodiments of the invention, examples of which are illustrated in the accompanying drawings.

DESCRIPTION OF THE PREFERRED EMBODIMENTS

Figure 5:
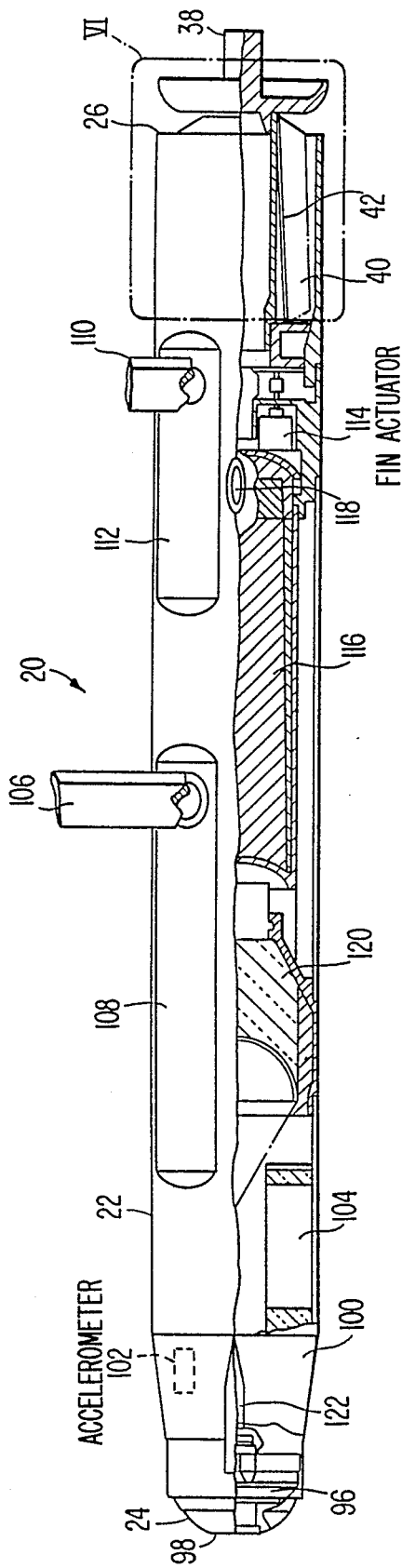
FIG. 5 is a partially cutaway plan view of one embodiment of the projectile of the invention.

In accordance with the invention, the optical fiber guided projectile for firing from a generally tubular launcher comprises a generally tubular casing having leading and trailing ends. As depicted in FIGS. 1, 2 and 5, projectile 20 includes a generally tubular casing 22 having a leading end 24 and a trailing end 26.

While the projectile of the invention may be fired from a cannon, certain modifications may be necessary if the barrel of the cannon is rifled. The preferred embodiment described herein is designed for firing from a generally conventional mortar. As depicted in FIG. 3, mortar 28 includes a substantially tubular launch tube 30 supported on a base plate 32 and a tripod or mount 34. Projectile 20 includes a propellant sting 38 which conventionally cooperates with the mortar to effect firing of the projectile.

In accordance with the invention, the projectile includes an extended length of optical fiber disposed in the casing for continuous streaming from the trailing end during flight of the projectile, a portion of the fiber extending from the trailing end of the casing to a one end of the fiber for operative connection to a controller.

Figure 10:
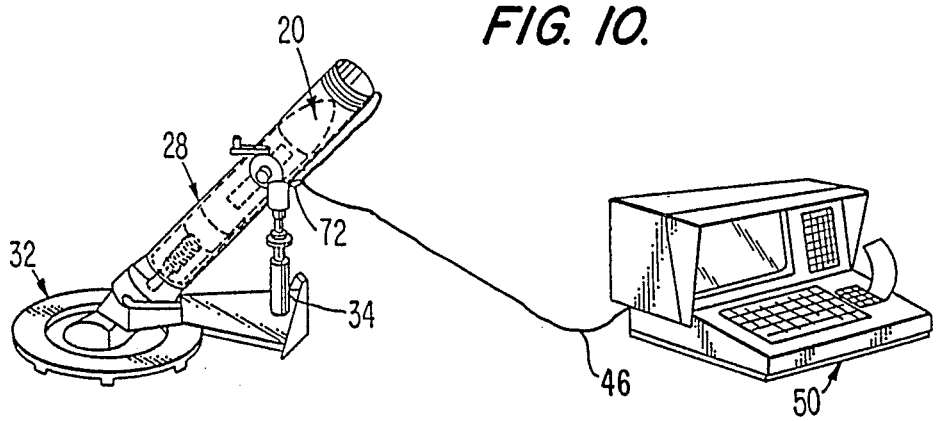
FIG. 10 is a perspective view of one embodiment of the weapons system of the invention.
Figure 11:
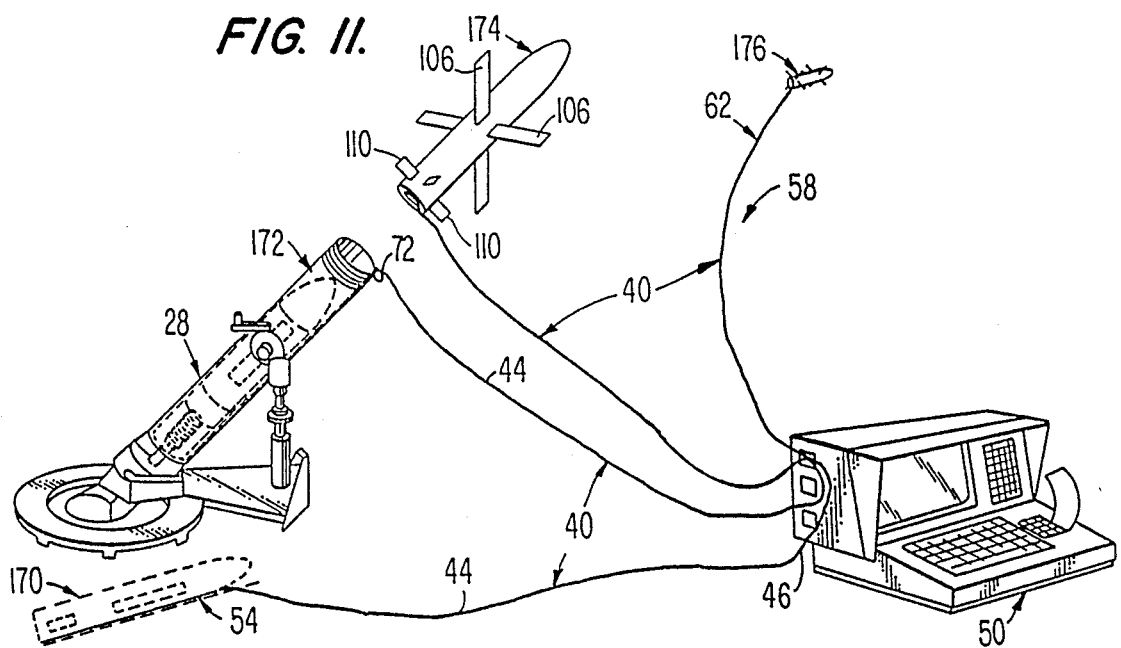
FIG. 11 is a perspective view of the invention depicted in FIG. 10 shown in various modes of operation.

In the preferred embodiment, the extended length of optical fiber 40 is wound on a bobbin 42 disposed in casing 22 proximate trailing end 26, as best seen in FIGS. 5-8. Fiber 40 is wound on bobbin 42 in a manner permitting tangle-free streaming from trailing end 26 while preventing damage to or shifting of the fiber during launch. A method of winding optical fiber on a bobbin which may be used in this invention is disclosed in applicant's copending application, Ser. No. 06/032,243, filed Mar. 31, 1987, the disclosure in which is specifically incorporated herein by reference. A portion 44 of fiber 40 extends from trailing end 26 of casing 22 to a one end 46 for operative connection to a controller 50 (FIGS. 2, 10 and 11).

The projectile of the invehtion includes groove means extending from the trailing end to proximate the leading end in the outside surface of the casing for removably receiving part of the extending fiber portion and means for securing the part of the extending fiber portion in the groove means with a force sufficient to resist axial forces generated during firing of the projectile but insufficient to damage the fiber on imposed radial separation of the fiber from the groove means on exit of the projectile from the launcher.

Figure 6:
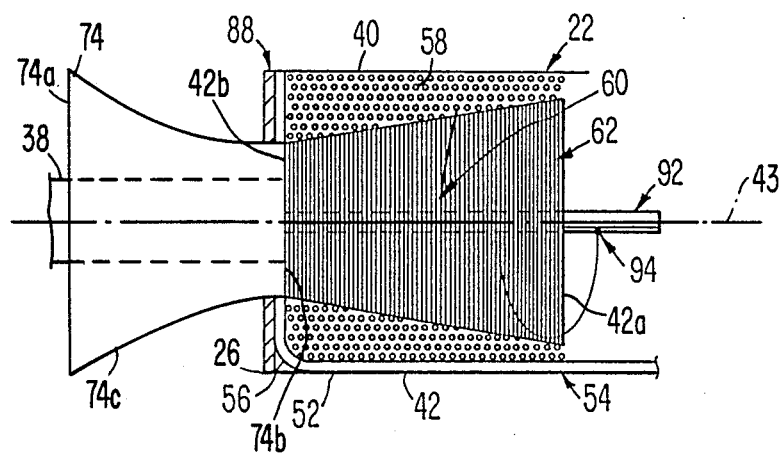
FIG. 6 is an enlarged cross-sectional plan view of the portion of the projectile of FIG. 5 encompassed by line VI.

As depicted in FIGS. 1 and 2, the preferred embodiment of the invention includes groove 52 extending from trailing end 26 to proximate leading end 24 in the outside surface of casing 22 for removeably receiving part 54 of extending fiber portion 44. As depicted in FIGS. 1A and 6, groove 52 accommodates fiber part 54 within the circumference of casing 22 so as not to interfere with the normal annular cooperation between projectile 22 and its tubular launcher, such as mortar barrel 30. Thus, while fiber part 52 axially extends between casing 22 and the inside of the launch tube, the propulsion force is not affected by blow-by.

Groove 52 terminates at trailing end 26 with a contoured bend 56 to avoid sharp bends in the fiber which may cause a fracture detrimental to fiber optical performance.

Preferably, extending fiber portion 44 is covered with a reinforcing coating which may be metal, plastic or fiberglass-reinforced or metallic-reinforced epoxy. Such a coating protects the fiber portion 44 extending from the launcher to the command/control console 50 and protects part 54 of the portion subjected to the highest stresses during launch. It is also preferred that the reinforcing coating continue on the fiber for a predetermined length so that reinforced fiber 58 FIG. 6) form the outside layers of fiber 40 on bobbin 42. The reinforcing coating gradually tapers in a transistion 60 to regular, unreinforced fiber 62 forming the inside layers on bobbin 42. A method of manufacturing reinforced optical fiber is disclosed in applicants' copending application, Ser. No. 07/032,242, filed Mar. 31, 1987, which is specifically incorporated herein by reference. Placement of several layers of reinforced fiber on the outside of bobbin 42 serves to prevent damage to or shifting of the more fragile regular fiber 62 during launch. If the fiber shifts or slumps during launch, tangles or other hindrances to free streaming of the fiber from bobbin 42 may result.

Part 54 of fiber extension 44 is preferably secured in groove 52 by means of one or more pieces of tape 64 adhesively secured to the surface of casing 22 transverse groove 52. Other means for securing part 54 in groove 52 may be used such as a single elongated piece of tape disposed lengthwise along groove 52, or a non-hardening adhesive. A shallow depression (not shown) the thickness of the tape may be provided to protect the tape during loading. The type, number and strength of elements used to secure part 54 in groove 52 may be varied and must be chosen with consideration given to the strength of the reinforced fiber and the G loads imposed on launch. The size of groove 52 should provide a relatively tight fit for part 54 of the fiber to prevent blow-by during firing, but the fit cannot be tight enough to preclude the need for some means for holding the fiber in the groove during handling and loading and during launch since the force necessary to remove part 54 from groove 52 during launch should be minimal. Accordingly, tape 64 or other means of securing the fiber part 54 must be chosen to have sufficient strength to resist forces generated during launch but insufficient to resist radial force imposed on the fiber as the projectile leaves the launch tube. The radial force necessary to remove part 54 from groove 52 must be less than the fracture strength of the reinforced fiber and must minimize the force imposed on the projectile to avoid affecting the desired trajectory of the projectile.

Figure 4:
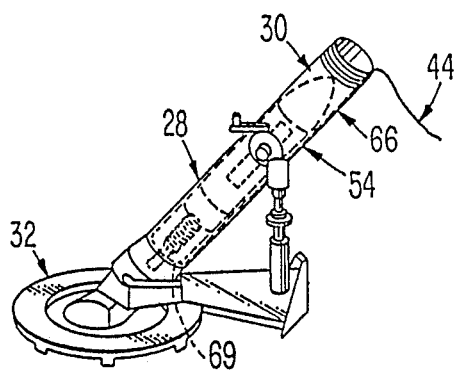
FIG. 4 is a plan view of a conventional mortar partially cut away to show an alternative embodiment of the projectile of the invention in place.
Figure 4A:
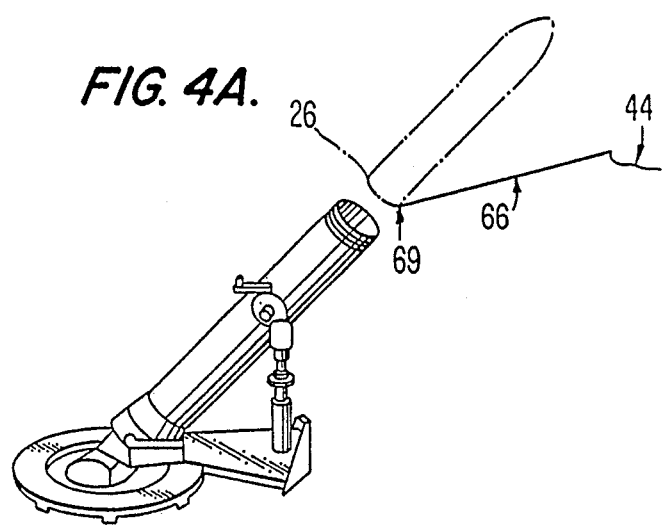
FIG. 4A depicts the relation of the projectile and mortar of FIG. 4 after firing.

An alternative means of securing fiber part 54 in groove 52 is depicted in FIGS. 4 and 4A. In this embodiment, the securing means comprises an elongated, substantially rigid cover 66 disposed in groove 52 defining an enclosed channel for receiving part 54 of extending fiber portion 44. Cover 66 may be in the form of a longitudinal half tube. Cover 66 is preferably pivotally attached by a hinge structure 69 at trailing end 26 and is loosely secured in groove 52 such that tension forces about hinge 69 generated at launch are sufficient to remove cover 66 from groove 52.

Imposing a radial force on the fiber part 54 to remove the fiber from groove 52 as the projectile leaves the launch tube is preferably accomplished by a one-way snubber engaging extending fiber portion 44 between the launch tube and the controller. Since it usually is preferable to avoid any modifications to the launch device snubber 68 (FIG. 3A) may be secured to some object or surface 70, such as the ground, proximate the launch tube. Snubber 68 imposes a radial force on fiber part 54 as the projectile leaves the launch tube while preventing application of force at one end 46 of fiber 44 connected to controller 50. An alternative disposition of a snubber is attachment by means of a removable pigtail 72 to the launch tube or support structure 34 proximate the muzzle thereof (FIG. 3).

Figure 7:
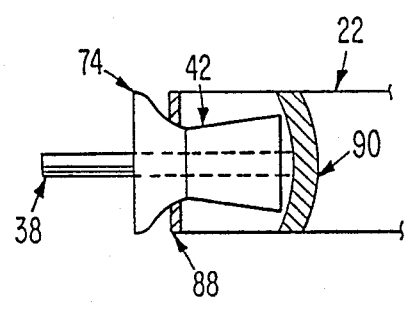
FIG. 7 is a representation of the optical fiber bobbin structure in the projectile of the invention.
Figure 8:
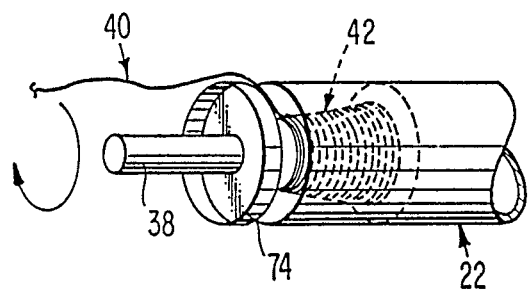
FIG. 8 is a perspective view of the bobbin structure of FIG. 7 shown in operation.

The shape of bobbin 42 and the disposition of fiber 40 thereon results in fiber 40 forming a helix pattern as it streams from trailing end 26. Sting 38 should not interfere with removal of fiber 40 from the projectile during flight, but to insure that it does not, means for guiding the fiber as it streams from casing 22 during flight, preferably, is included in the projectile. As depicted in FIGS. 6-8, sting 38 includes circular adaptor 74 coaxially secured to sting 38 and axially spaced from trailing end 26 of casing 22. Adaptor 74 has a rounded periphery for guiding fiber 40 as it streams in a helix pattern from the projectile.

Adaptor 74 has a pair of opposing large and small diameter end faces 74a, 74b, respectively, and an outer peripheral surface 74c which tapers smoothly therebetween in the direction of bobbin axis 43, which also is the axis of adaptor 74. Projectile casing 22 encloses bobbin 42, with casing end 26 being spaced from adaptor end face 74a a distance sufficient to allow unimpeded streaming of fiber 40. The axial shape of adaptor outer surface 74c is similar to that of the cosine function between 0° and 90° at adaptor ends 74a and 74b, respectively. The diameters of adaptor end faces 74a, 74b and the overall length of adaptor 74 are chosen to assist rather than change the natural helix pattern of fiber 40 as it streams from the project tile as depicted in FIG. 8. Generally, the diameter of end face 74a will be approximately the diameter of the filled bobbin 42, and the diameter of end face 74b will be approximately equal that of smaller bobbin end 42b. Although the shape, diameter and materials of adaptor 74 must be chosen to avoid interference with the aerodynamics of the projectile and the streaming fiber as discussed above, they also may be selected to provide a gas seal to prevent expanding launch gases from escaping past the projectile, called "blow-by." Thus, adaptor 74 may function as an obturator as well as a fiber guide.

Figure 9:
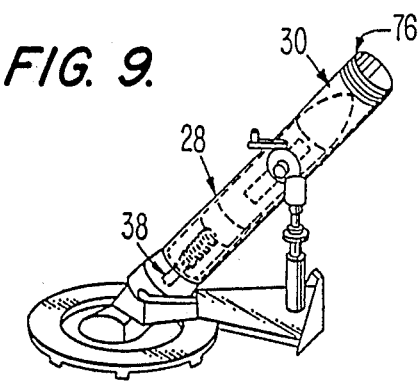
FIG. 9 is a plan view of a conventional mortar cut away to show an alternate embodiment of the projectile of the invention in place.
Figure 9A:
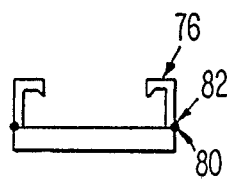
FIG. 9A is a cross-sectional view of the grabber as depicted on the muzzle of the mortar of FIG. 9.
Figure 9B:
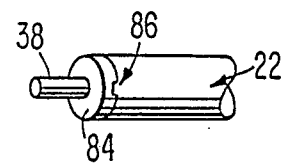
FIG. 9B is an enlarged perspective view of the trailing end of the projectile shown in place in FIG. 9.

An alternative embodiment which eliminates possible interference between sting 38 and streaming fiber 40 is depicted in FIGS. 9, 9A and 9B. In this embodiment, sting 38 is designed to drop away from the projectile during launch by action of the reinforced fiber or by action of a grabber element 76 disposed in the muzzle of the launch tube 30. Two or more grabber elements 76 are pivotally secured to muzzle 78 by hinge 80 which is biased by spring 82 toward the axis of tube 30. Sting 38 is fixed to plate 84 removeably fixed to trailing end 26 of casing 22. Plate 84 includes notches 86 disposed for engagement by grabbers 76 as the projectile leaves tube 30. The direction of removal of sting 38 and its associated plate 84 is controlled by the shape and placement of grabber elements 76.

As depicted in FIGS. 6 and 7, the projectile preferably includes a frangible end plate 88 enclosing trailing end 26 to protect bobbin 42 and fiber 40 during shipment and handling. End plate 88 is designed to break during launch either from the force of the launch or the action of the reinforced fiber as it is removed from casing 22. Bobbin 42 and fiber 40 may also be further protected by disposing bobbin 42 axially adjacent a structural hard point 90 of casing 22.

In accordance with the invention, the projectile includes means in the casing connected to the other end of the fiber for data communication through the fiber. Preferably, the projectile also includes means in the casing for sensing target data and for communicating that data via the communications means through the fiber. The projectile also preferably includes means in the casing responsive to data received through the fiber via the communication means for controlling the flight path of the projectile.

In the preferred embodiment depicted in FIGS. 5 and 6, the communication means is an electro/optical encoder/decoder 92 is disposed in casing 22 and suitably connected to the other end 94 of fiber 40. The encoder/decoder 92 constitutes two elements, a decoder operating at a frequency F1 for receiving data in optical form through fiber 40 and transforming the data to corresponding electrical signals and an encoder operating at a frequency F2 for receiving electrical signals generated by components in the casing and transforming those signals to optical form for transmission through fiber 40. The use of optical fiber 40 permits simultaneous two-way transmission to and from the encoder/decoder.

The projectile preferably includes a target seeker, sensor or camera 96 disposed in casing 22 proximate leading end 24 behind a protective dome 98. Such seekers, sensors or cameras and associated controls are well known in the art. One example of a seeker is disclosed in applicant's U.S. Pat. No. 4,615,496. Equally well known and disposed in casing 22 is electronic means for converting data received by a seeker to electrical signals. Such signals are conveyed to encoder 92 for transmission over fiber 40. Known rate sensors and accelerometers 102, for stabilization and control, are also disposed in casing 22 and electrically connected to encoder/decoder 92 for communicating over fiber 40 projectile trajectory data. All electrical equipment is powered by battery 104, such as a thermal battery, disposed in casing 22.

The projectile also includes means responsive to data received over fiber 40 for guidance. As depicted in FIG. 5, two sets of air foils are provided. Wings 106 are stored in wing storage area 108 and extended after launch to provide lift for increased flight range and performance. Fins 110 are stored in fin storage area 112 and extended after launch. A fin actuator 114 is disposed in casing 22 in electrical communication with decoder 92 for selectively altering the flight trajectory of the projectile in response to signals received over fiber 40. Preferably, fin actuator 114 comprises an actuator driver disposed to receive guidance data from decoder 92 and to transmit pulse width modulation commands to fin controllers for selectively positioning fins 110. Alternatively, fins may be positioned by gas actuators functioning in response to data received over fiber 40 through decoder 92. The projectile also includes a sustainer motor 116 and sustainer nozzles 118.

In the embodiment depicted in FIG. 5, the projectile includes a warhead 120 and a standoff fuse 122. Other embodiments of the invention may be used for purposes, such as establishing communication between remote locations, which do not require the warhead and fuse.

The two-way data transmission afforded by the optical fiber permits retaining on the ground most of the electronics necessary or desirable for guiding a projectile, thus substantially reducing the weight, complexity and cost of the projectile.

The invention also includes a system essentially comprising the projectile as described above and a command and control means for receiving and processing target data transmitted from the projectile and for transmitting guidance data to the projectile. The command and control means is embodied in control console 50 operatively connected to one end 46 of extended fiber portion 44. Console 50 preferably includes a plurality of optical fiber interface connectors 130 (FIG. 2) providing means for connecting several projectiles to a single controller 50. The multiple connectors 130 permit rapid set-up and sequential firing of projectiles which is frequently a battlefield requirement.

The command and control means includes in controller 50 means for presentation of real-time target data received from the projectile in various forms and means for controlling projectile flight by transmission of control data to the projectile, including direct operator interface. As depicted in FIG. 12, the command and control means preferably includes an optical splitter 132 in communication with each optical interface connector 130. Splitter 132 separates incoming signals from outgoing signals both of which are traveling over the optical fiber. The incoming signal, encoded by encoder 92 in the projectile, is converted into an electrical signal by optical/electrical converter 134. Converter 134 may be a pin-type detector responsive to signals at a selected wavelength. Encoder 92 in the projectile transmits at frequency F2 and converter 134 is set to receive at that frequency. Converter 134 generates an electrical signal analog of the input optical signal, amplifies the signal to the desired level, and formats the incoming data. Signals from converter 134 are conveyed to an I/O unit 136 from which the data is routed to either a video system 138 or a flight control system 140 depending on the format and the identifier placed on the data by the I/O unit 136.

Data transmitted to the video system goes directly to the video display 142 and/or to a video data processor 144. Data processor 144 permits raw data to be displayed at video display 142, permits false color data representations to be presented, permits data from multiple sensors to be overlayed on the display, permits electronic zoom or magnification of a part of the display, and permits manipulations of contrast and other processing of data using various data analysis and correlation techniques.

Data input to the video system 138 may be taken from visible light, infrared or ultraviolet focal plane array camera, scanning camera, or conventional vidicon, or millimeter wave sensor, and the data may be from any single or multiple sensors. For example, dual mode infrared/millimeter wave seekers provide infrared and millimeter wave signals from which images can be created where the position of the seeker head and its motion is known. Such images are displayed by the video data processor 144 on display 142 for use by the operator.

The command and control also preferably includes a sensor data processing computer 150 which functions to execute target recognition and identification algorithms individually for visible, infrared and millimeter wave signals, to determine parameters, such as range to target, for use in guidance and control algorithms, and to execute target recognition and identifier algorithms based on visible infrared and millimeter wave data.

Output of sensor data processing computer 150 is routed to video display 142 by mode controller 152. Thus, if the operator detects a target and wishes to initiate an attack, he can designate display of the selected target on display 142. The operator/data interface may be by use of a touch or light pen actuator 154 which permits rapid control action. Activation of the light pen actuator 154 initiates a sequence of events by mode controller 152 which transmits target identification, for example, to the image feature tracker 156 which is in two-way communication with seeker head controller 158. The latter generates signals to control the seeker in the projectile and through guidance and control processor 160 initiates and executes projectile trajectory changes to effect an attack on the selected target.

Information from guidance and control processor 160, seeker or camera head controller 158, and mode controller 152 are transmitted through flight control system 140 where it is tagged and formatted and routed to I/O unit 136 for transmission at frequency F1 via electrical/optical converter 162 to the projectile.

Controller 50 includes a joy stick controller 164 permitting direct operator control of projectile flight for purposes of examining additional targets or manually flying the projectile onto the target. All normal and routine flight control and navigation functions are automatically performed by guidance and control processor 160.

In operation, a plurality of projectiles will be available at a launch site in association with a mortar launcher and a controller. Thus, as depicted in FIG. 11, projectiles 170, 172, 174 and 176 are all connected by optical fiber 40 to controller 50. Projectile 170 is in reserve and is depicted with part 54 of fiber extending portion 44 diposed in the groove in casing 22. Projectile 172 has been dropped into mortar tube 28 after reinforced fiber portion 44 is attached to a snubber on pigtail 72 and to console 50. The projectile propulsive charge is then ignited in the usual manner propelling the projectile from tube 28. Snubber 72 pulls fiber part 54 from the groove and the frangible end plate is removed as the projectile leaves the tube. The reinforced fiber then streams from the bobbin. After some length of flight, the fiber transitions from reinforced fiber 58 to regular fiber 62. Controller 50 is used by the operator to select a target for and control attack of projectile 176, and then the controller shifts to performing the same function for the other projectiles.

As an alternative to the above-described system wherein a fiber-receiving groove is formed in the projectile casing, and in accordance with a further aspect of the invention, a modified launcher is provided including a launcher tube generally cylindrical in shape and having a base end, a launch end, and an inner peripheral surface Importantly, relief means are formed in the inner peripheral surface of the tube extending axially from the trailing end positions to the launch end. The relief means is sized and configured to removeably receive a part of the extending fiber before and during launch. The tube is sized to receive the projectile, which in this alternate embodiment can have an ungrooved casing wall, with the projectile trailing end proximate the tube base end and with the optical fiber extending out from the launch end for connection to suitable communication means as described above.

Figure 13A:
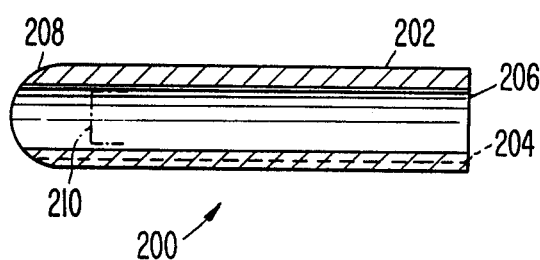
FIG. 13A is a schematic representation of longitudinal cross-section of a launcher tube of an alternate embodiment of a system for launching optical fiber guided projectiles and made in accordance with the present invention.
Figure 13B:
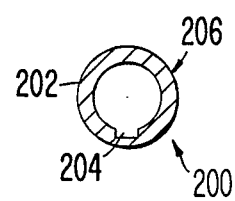
FIG. 13B is an axial cross-section of the launcher tube shown in FIG. 14A.

As embodied herein and with reference now to FIGS. 13A and 13B, launcher designated generally by the number 200 includes a barrel or tube 202 built with a relief or groove 204 for receiving a length of optical fiber running from the muzzle or launch end 206 to the breech or base end 208. The diameter tube 202 is typically made only slightly larger than the projectile casing diameter. Also, the width of the fiber relief 204 may be many times the diameter of the fiber for ease of loading the projectile or missile into the tube. The relief depth, however, should be minimal such that the depth is preferably not over 10% greater than the fiber diameter relief 204; that is, the preferred relief depth is less than about 110% of the fiber diameter Also, for non-breech loading tubes 202, the length of relief 204 need extend only to about the position of the trailing end 210 of the projectile in the launch position (shown dotted in FIG. 13A).

Figure 14A:
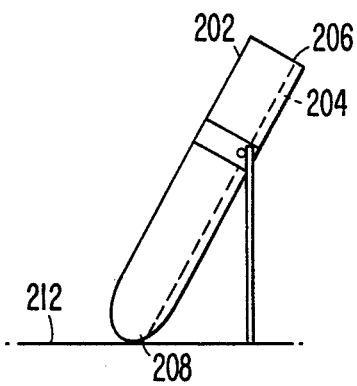
FIG. 14A is a schematic showing the launcher tube of FIG. 13A positioned for receiving and launching a projectile.
Figure 14B:
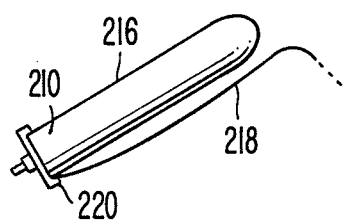
FIG. 14B depicts a suitable optical fiberguided projectile for loading into the launch tube of FIG. 14A.
Figure 14C:
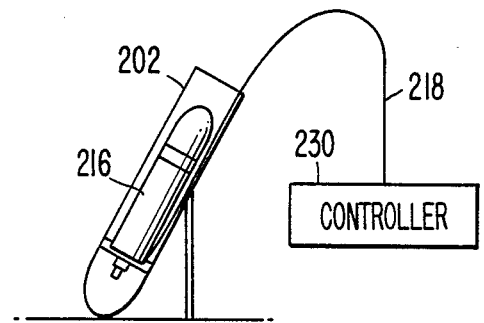
FIG. 14C depicts the projectile loaded in the launch tube and interconnected with a controller via optical fiber.

FIGS. 14A–14C depict the manner in which a fiber optic guided missile, projectile or mortar round is placed in the tube. FIG. 14A shows launcher tube 202 with fiber relief 204 at the circumferential position closest to ground 212. Missile 216 includes fiber 218 extending from missile trailing end 210, as can be seen in FIG. 14B. As depicted, the optical fiber 218 is first pulled along the side of the missile or projectile 216 and it can be temporarily fastened such as by a weak adhesive or tape. Next, as seen in FIG. 14C, projectile 216 is placed in the barrel or tube 202 such that fiber 218 fits into relief 204. A sabot 220 provides a gas seal to prevent blow-by by hot exhaust gases. (FIG. 14B). Sabot 220 also provides the forcing or "pushing" function that assures exit of fiber 218 located in relief 204 from the tube 202.

Figure 15A:
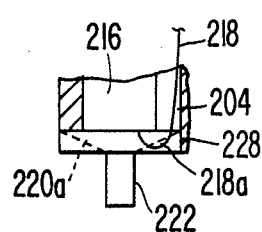
FIG. 15A is a partial longitudinal cross-section of the projectile loaded in the launch tube of FIG. 14C showing a sabot element.
Figure 15B:
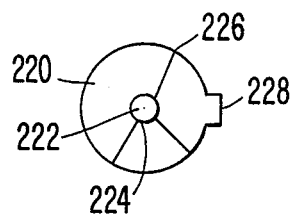
FIG. 15B is an end view of the sabot element of FIG. 15A.

FIGS. 15A and 15B depict a preferred construction of sabot 220. As illustrated in FIGS. 14B and 14C, missile 216 includes propellant sting 222 which is received in sabot aperture 224. Score lines 226 are formed on one or both sabot faces to promote frangibility and separation following launch. Sabot tab member 228 is provided to engage relief 204 and can be made integral with sabot 220.

propellant sting 222 is constructed to allow sabot 220 to have a concave section 220a next to the projectile trailing end 210. Optical fiber 218 is routed down the fiber relief 204 with a turnaround portion 218a where the fiber 218 enters projectile 216 at the trailing end 210. Sabot tab member 228 fits into the fiber relief 204. Upon firing, the propellant gases break the score lines 226, and sabot tab member 228 pushes the fiber out of relief 204. As projectile 216 leaves mortar-launch tube 202, the sabot separates at the score lines and falls away. Fiber 218 then pays out normally from projectile 216.

As fiber 218 pays out from projectile 216, sensory data and/or control command signals can be exchanged between projectile 216 and ground-based command and control means, e.g. controller 230 depicted in FIG. 14C, which can have the same functions as controller 50 discussed in relation to the alternate embodiment shown in FIG. 2. Also, the sensory and flight control components of projectile 216 can be the same as those discussed previously in relation to projectile 20 of the alternate embodiment shown in FIGS. 2 and 5.

The invention provides a system for launching an optical fiber guided projectile having a control system for guiding the projectile while in flight. It will be apparent to those skilled in the art that various modifications and variations could be made to the projectile launch system of the invention without departing from the scope or spirit of the invention.

What is claimed is:

1. Apparatus for guiding fiber streaming from a wound bobbin in a direction parallel to the bobbin axis, the bobbin being in the shape of a truncated cone having axial ends, and the fiber streaming axially from the vicinity of the smaller diameter bobbin end, the apparatus comprising:
    an adaptor element having an axis, opposing circular end faces of different diameter, and a smooth, axially tapering outside surface; and
    means for connecting said adaptor element to the bobbin with the smaller diameter one of said circular adaptor end faces coaxially adjacent the smaller diameter bobbin end.

2. The apparatus as in claim 1 wherein the axial shape of the outside surface of said tapered adaptor is cosinusoidal from the larger diameter end face to the smaller diameter end face.

3. The apparatus as in claim 1 wherein the larger diameter end of said adaptor has a diameter substantially equal to the maximum diameter of the filled bobbin.

4. The apparatus in claim 1 further including a cylindrical housing having a housing end axially spaced from said adaptor element large diameter end face, said housing at least partially enclosing the filled bobbin.

5. The apparatus as in claim 1 wherein said adaptor element smaller diameter end face abuts the smaller diameter bobbin end and is substantially equal in diameter.

* * * * *